(12) United States Patent
Pokriefka et al.

(10) Patent No.: US 10,870,397 B2
(45) Date of Patent: Dec. 22, 2020

(54) ACCESSORY MOUNTING SYSTEM FOR VEHICLES

(71) Applicant: Nissan North America, Inc., Franklin, TN (US)

(72) Inventors: Edward Pokriefka, Farmington Hills, MI (US); Martin Petersen, Canton, MI (US); Dale Butterworth, Brighton, MI (US)

(73) Assignee: Nissan North America, Inc., Franklin, TN (US)

( * ) Notice: Subject to any disclaimer, the term of this patent is extended or adjusted under 35 U.S.C. 154(b) by 189 days.

(21) Appl. No.: 16/229,714

(22) Filed: Dec. 21, 2018

(65) Prior Publication Data

US 2020/0198543 A1 Jun. 25, 2020

(51) Int. Cl.
*B60R 11/00* (2006.01)
*B60R 9/02* (2006.01)
*B62D 33/027* (2006.01)
*B60R 9/06* (2006.01)
*B60R 5/04* (2006.01)

(52) U.S. Cl.
CPC .............. *B60R 9/02* (2013.01); *B62D 33/027* (2013.01); *B60R 5/041* (2013.01); *B60R 9/06* (2013.01); *B60R 2011/004* (2013.01); *B60R 2011/0052* (2013.01); *B60R 2011/0059* (2013.01); *B60R 2011/0066* (2013.01); *B60R 2011/0071* (2013.01); *B60R 2011/0082* (2013.01)

(58) Field of Classification Search
CPC combination set(s) only.
See application file for complete search history.

(56) References Cited

U.S. PATENT DOCUMENTS

| 4,836,478 | A | * | 6/1989 | Sweere | A47B 21/00 248/279.1 |
| 5,588,631 | A | * | 12/1996 | Yee | B60R 11/06 211/4 |
| 5,611,513 | A | * | 3/1997 | Rosen | F16M 11/10 248/222.11 |

(Continued)

FOREIGN PATENT DOCUMENTS

| CN | 204488659 U | 7/2015 |
| CN | 204761632 U | 11/2015 |

(Continued)

*Primary Examiner* — Monica E Millner
(74) *Attorney, Agent, or Firm* — Young Basile Hanlon & MacFarlane, P.C.

(57) ABSTRACT

The present disclosure describes an accessory mounting system for vehicles. The mounting system is reconfigurable between collapsed and expanded configurations, and includes first and second brackets. The first bracket is configured for releasable connection to a vehicle (e.g., via a utility track), and the second bracket is movably connected to the first bracket and configured to support an accessory, such as a speaker, a television, a monitor or other such display, and the like. The first bracket includes a rotatable locking mechanism that is engageable with the second bracket, as well as at least one fastener that is configured to releasably engage the vehicle (e.g., the utility track). The at least one fastener is positioned between the first and second brackets such that the at least one fastener is inaccessible when the mounting system is in the collapsed configuration.

20 Claims, 6 Drawing Sheets

(56) References Cited

U.S. PATENT DOCUMENTS

| | | | |
|---|---|---|---|
| 8,094,438 B2* | 1/2012 | Dittmer | F16M 11/2014 |
| | | | 361/679.01 |
| 9,408,465 B2* | 8/2016 | Dowling | F16M 13/02 |
| 10,343,778 B2* | 7/2019 | Peuziat | F16M 13/02 |
| 10,378,690 B2* | 8/2019 | Carnevali | F16M 11/2085 |
| 10,619,661 B2* | 4/2020 | Hagedorn | B60R 11/00 |
| 2007/0097617 A1* | 5/2007 | Searby | G06F 1/1632 |
| | | | 361/679.4 |
| 2007/0295870 A1* | 12/2007 | Peterson | F16M 11/2014 |
| | | | 248/125.7 |
| 2008/0016650 A1* | 1/2008 | Moon | F16M 11/10 |
| | | | 16/334 |
| 2010/0043503 A1* | 2/2010 | Yao | F16M 11/041 |
| | | | 70/58 |
| 2011/0233351 A1* | 9/2011 | Foster | B60R 11/0252 |
| | | | 248/125.7 |
| 2013/0193174 A1* | 8/2013 | Ackeret | B60R 7/04 |
| | | | 224/275 |
| 2016/0120303 A1* | 5/2016 | Constantino | F16M 13/022 |
| | | | 108/28 |
| 2017/0209318 A1* | 7/2017 | Schroeder | B64C 1/20 |
| 2018/0326885 A1 | 11/2018 | Greiner et al. | |

FOREIGN PATENT DOCUMENTS

| | | |
|---|---|---|
| CN | 104760543 B | 3/2017 |
| JP | H09142223 A | 6/1997 |

\* cited by examiner

FIG. 4
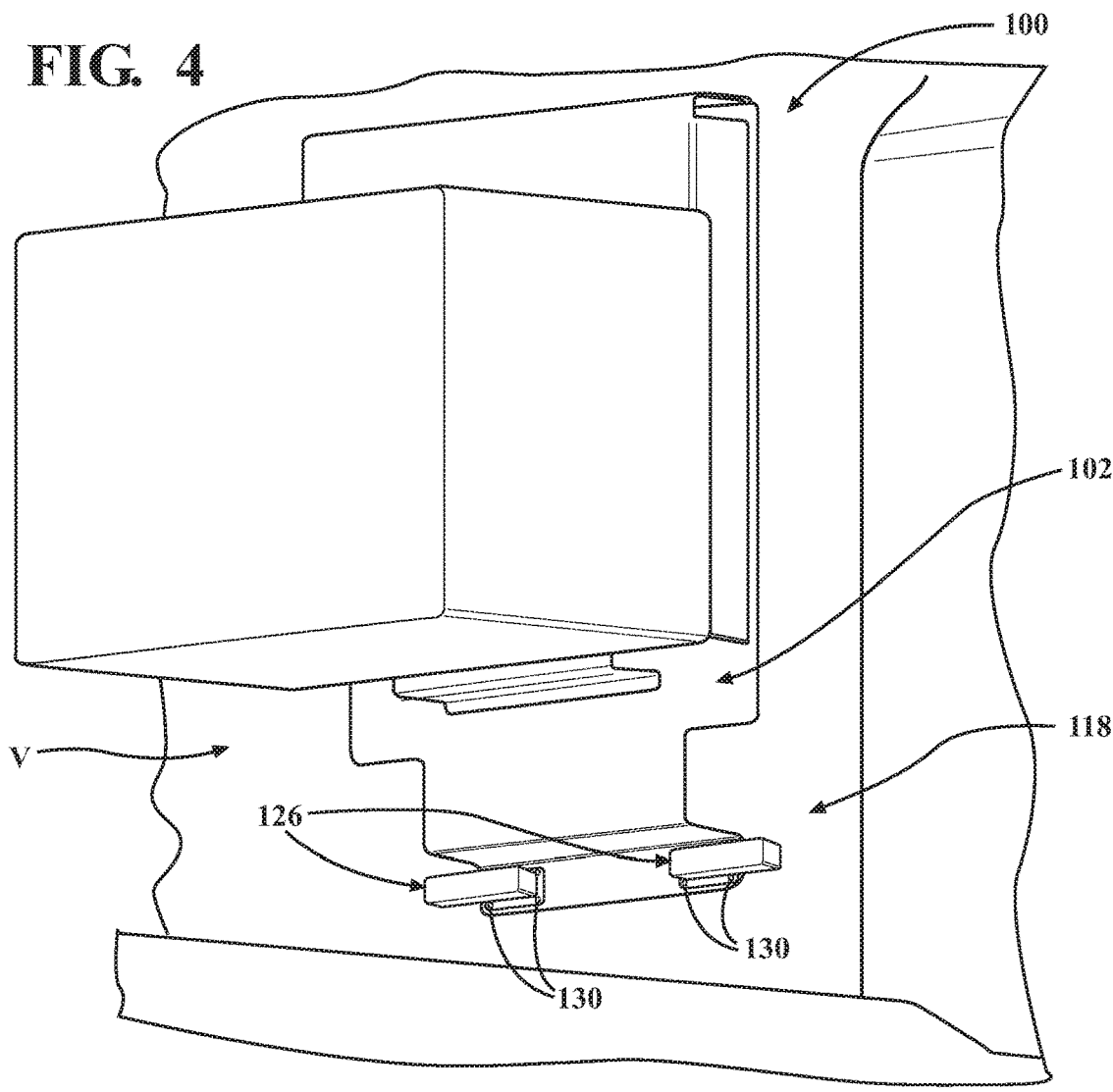
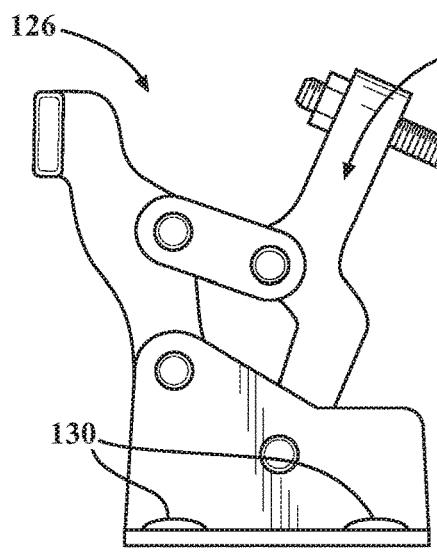
FIG. 5
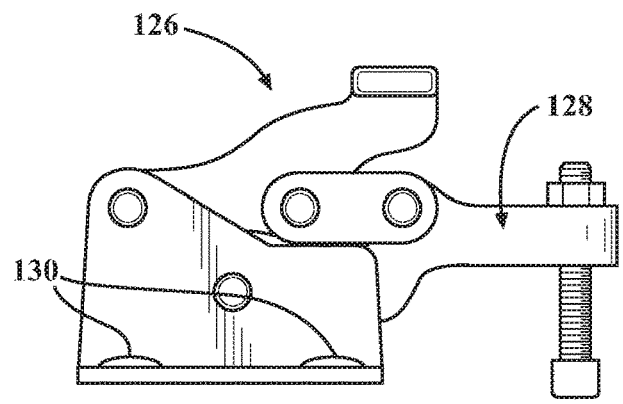
FIG. 6

ACCESSORY MOUNTING SYSTEM FOR VEHICLES

TECHNICAL FIELD

The present disclosure relates generally to vehicles, and, more specifically, to a mounting system for accessories.

BACKGROUND

Certain vehicles, such as pickup trucks, include hardware (e.g., tracks, rails, cleats, adjusters, and other tie-down structures) that support a variety of functions, including, for example, securing loads and other cargo within the vehicle. The present disclosure describes mounting systems that are configured for use with such hardware to support various accessories, including speakers, televisions, monitors and displays, and the like.

SUMMARY

In one aspect of the present disclosure, a vehicle is described including a utility track that is secured to a wall of the vehicle, and a mounting system that is configured to support an accessory. The mounting system is configured for releasable connection to the utility track, and is reconfigurable between a collapsed configuration and an expanded configuration. The mounting system includes: a first bracket that is configured for releasable connection to the utility track; a second bracket that is movably connected to the first bracket and configured to support the accessory; and a locking member that is configured for removable insertion into an opening defined in the second bracket. The first bracket includes at least one fastener that is configured to releasably engage the utility track in the vehicle. The at least one fastener is positioned between the first and second brackets such that the at least one fastener is inaccessible when the mounting system is in the collapsed configuration. The locking member is rotatable between a first position, in which the locking member is positioned to engage the second bracket to maintain the collapsed configuration of the mounting system, and a second position, in which the locking member is positioned for passage through the opening in the second bracket to permit movement of the second bracket in relation to the first bracket such that the mounting system is movable into the expanded configuration.

In certain embodiments, the first bracket may include a series of articulable arms. When the mounting system is in the collapsed configuration, the arms extend in generally parallel relation to the first bracket, and when the mounting system is in the expanded configuration, at least one of the arms extends transversely in relation to the first bracket.

In certain embodiments, the series of arms may include a first arm and a second arm. In such embodiments, the first arm may have a first end portion that is pivotably connected to a body of the first bracket, and an opposite second end portion, and the second arm may have a first end portion that is pivotally connected to the second end portion of the first arm, and an opposite second end portion that is pivotally connected to the second bracket such that the second bracket is pivotable in relation to the second arm.

In certain embodiments, the series of arms may include a first arm, a second arm, and a third arm, wherein the second arm is positioned between the first arm and the third arm. In such embodiments, the first arm and the third arm may each be pivotally connected to a body of the first bracket, and the second arm may be pivotally connected to the first arm and the third arm.

In certain embodiments, the second arm may include opposite first and second end portions, wherein the first end portion of the second arm is pivotally connected to the first arm and the third arm, and the second end portion of the second arm is pivotally connected to the second bracket such that the second bracket is pivotable in relation to the second arm.

In certain embodiments, the at least one fastener may be rotatable between first and second positions. In the first position, the at least one fastener may be oriented in general alignment with the utility track such that the at least one fastener is disengageable from the utility track to allow for movement of the first bracket in relation to the utility track, and in the second position, the at least one fastener may be oriented out of general alignment with the utility track such that the at least one fastener is engageable with the utility track to fixedly secure the first bracket to the utility track.

In certain embodiments, the locking member may be configured to receive a key. In such embodiments, the locking member may be rotatable from the first position to the second position upon insertion of the key.

In another aspect of the present disclosure, an accessory mounting system for a vehicle is disclosed, the accessory mounting system including: a first bracket that is configured for releasable connection to a utility track in the vehicle; a second bracket that is movably connected to the first bracket and configured to support an accessory; and a locking mechanism that is repositionable between locked and unlocked configurations. The first bracket includes a series of arms that are articulable to move the accessory mounting system between a collapsed configuration, in which each of the arms extends in generally parallel relation to the first bracket, and an expanded configuration, in which at least one of the arms extends transversely in relation to the first bracket. In the locked configuration, the locking mechanism is configured to maintain the collapsed configuration of the accessory mounting system such that the accessory mounting system is secured to the vehicle, and in the unlocked configuration, the locking mechanism is configured to permit movement of the accessory mounting system into the expanded configuration such that the accessory mounting system is removable from the vehicle.

In certain embodiments, the series of arms may include a first arm and a second arm. In such embodiments, the first arm may have a first end portion that is pivotably connected to a body of the first bracket, and an opposite second end portion, and the second arm may have a first end portion that is pivotally connected to the second end portion of the first arm, and an opposite second end portion that is pivotally connected to the second bracket such that the second bracket is pivotable in relation to the second arm.

In certain embodiments, the series of arms may include a first arm, a second arm, and a third arm, wherein the second arm is positioned between the first arm and the third arm. In such embodiments, the first arm and the third arm may each be pivotally connected to a body of the first bracket, and the second arm may be pivotally connected to the first arm and the third arm.

In certain embodiments, the second arm may include opposite first and second end portions, wherein the first end portion of the second arm is pivotally connected to the first arm and the third arm, and the second end portion of the second arm is configured to support the second bracket such that the second bracket is pivotable in relation to the second arm.

In certain embodiments, the first bracket may further include at least one fastener that is configured to releasably engage the utility track in the vehicle.

In certain embodiments, the at least one fastener may be positioned between the first and second brackets such that the at least one fastener is inaccessible when the accessory mounting system is in the collapsed configuration.

In certain embodiments, the at least one fastener may be repositionable between a first position, in which the at least one fastener is positioned for disengagement from the utility track so as to allow for movement of the first bracket in relation to the utility track, and a second position, in which the at least one fastener is positioned for engagement with the utility track to fixedly secure the first bracket to the utility track.

In certain embodiments, the at least one fastener may be configured for rotation between the first position and the second position. In such embodiments, the at least one fastener may be oriented in general alignment with the utility track in the first position, and the at least one fastener may be oriented out of general alignment with the utility track in the second position.

In certain embodiments, the locking mechanism may include a locking member that is rotatable between a first position, in which the locking mechanism is in the locked configuration, and a second position, in which the locking mechanism is in the unlocked configuration.

In certain embodiments, the locking member may be configured to receive a key. In such embodiments, the locking member may be rotatable from the first position to the second position upon insertion of the key.

In certain embodiments, the second bracket may include an opening that is configured to receive the locking member when the accessory mounting system is in the collapsed configuration. In such embodiments, the locking member may be configured to extend through the opening such that the locking member is engageable with the second bracket upon movement of the locking member into the first position to move the locking mechanism into the locked configuration.

In another aspect of the present disclosure, an accessory mounting system for a vehicle is disclosed that includes: an outer bracket; an inner bracket that is movably connected to the outer bracket such that the accessory mounting system is reconfigurable between a collapsed configuration and an expanded configuration; a pivot member that is configured to pivotally connect the inner bracket to an accessory to facilitate repositioning of the accessory; at least one fastener that is configured to releasably connect the outer bracket to the vehicle; and a locking mechanism that is secured to the outer bracket. The at least one fastener is positioned between the inner and outer brackets such that the at least one fastener is inaccessible when the accessory mounting system is in the collapsed configuration, and the locking mechanism is engageable with the inner bracket to maintain the collapsed configuration of the accessory mounting system, and disengageable from the inner bracket to permit movement of the accessory mounting system into the expanded configuration.

In certain embodiments, the locking mechanism may include a locking member that is configured for receipt by an opening formed in the inner bracket.

In certain embodiments, the locking member may be rotatable between a first position, in which the locking member is oriented in general alignment with the opening in the inner bracket to allow for insertion of the locking member into the opening and removal of the locking member from the opening, and a second position, in which the locking member is oriented out of general alignment with the opening in the inner bracket to prevent removal of the locking member from the opening.

In certain embodiments, the locking member may be configured to receive a key. In such embodiments, the locking member may be rotatable from the first position to the second position upon insertion of the key.

BRIEF DESCRIPTION OF THE DRAWINGS

According to common practice, the various features of the drawings may not be to scale, and may be arbitrarily expanded or reduced for clarity.

FIG. 4 is a side, perspective view of an embodiment of the mounting system including one or more securement members that are configured to stabilize the mounting system.

FIG. 5 is a front, perspective view of one of the securement members seen in FIG. 4 shown in an open configuration.

FIG. 6 is a front, perspective view of the securement member seen in FIG. 5 shown in a closed configuration.

DETAILED DESCRIPTION

The present disclosure describes a mounting system that is configured to connect an accessory, such as a speaker, a television, a monitor or other such displays, etc., to a vehicle (e.g., a pickup truck). The mounting system is configured for connection to, and disconnection from, the vehicle to allow the mounting system and the accessory to be removed when not in use (e.g., to prevent theft of the mounting system and/or the accessory). For example, in certain embodiments, the mounting system may be configured for connection to a utility track that is secured to an inner wall of the vehicle.

The mounting system includes an outer bracket with one or more fasteners and a locking member, an inner bracket that supports the accessory, a series of movable arms, and a locking mechanism. The arms are articulable between a variety of positions so as to permit reconfiguration of the mounting system between collapsed and expanded configurations, and to allow for variation in the particular orientation of the accessory. The inner and outer brackets include corresponding configurations, and collectively define an interior space that conceals the fastener(s) when the mounting system is in the collapsed configuration. As such, when the mounting system is in the collapsed configuration, engaging (locking) the locking mechanism inhibits (if not entirely prevents) access to the fasteners, thus guarding against the unwanted removal and/or theft of the mounting system and/or the accessory.

Figure 1:
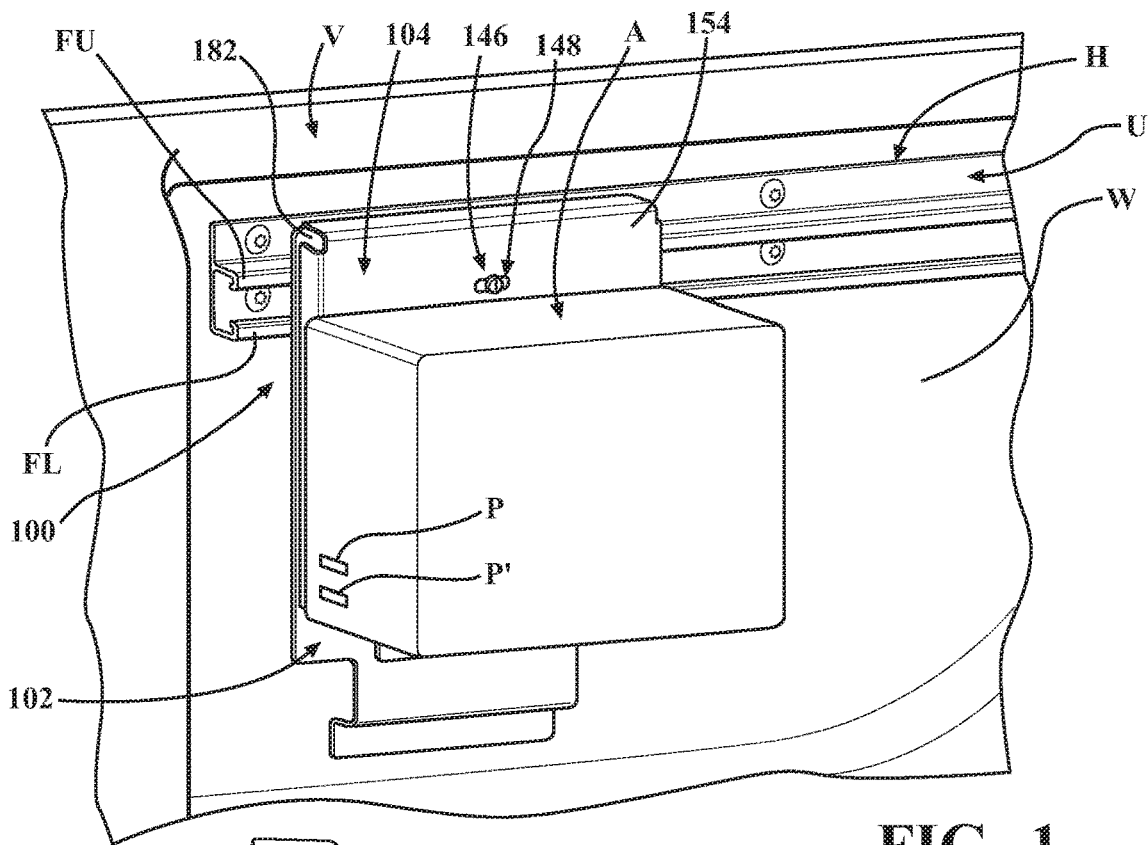
FIG. 1 is a front, perspective view of a mounting system supporting an attached accessory, and shown connected to a utility track in a vehicle.

FIGS. 1-11 illustrate various embodiments, implementations, and features of the presently disclosed mounting system, which is identified by the reference character 100. The mounting system 100 supports an accessory A (FIGS. 1, 2), and is configured for releasable and movable connection to a vehicle V via hardware H (FIG. 1). Although the hardware H is illustrated and described herein as a utility track U that is secured to a wall W of the vehicle V configured as a pickup truck, it should be appreciated that the mounting system 100 may be configured for use with other styles or models of vehicle V. Additionally, it should be appreciated that the mounting system 100 may be configured for connection to the vehicle V in alternate locations, and to alternate styles of hardware H. For example, the mounting system 100 may be configured for connection to an interior wall of the vehicle V (e.g., within the passenger compartment). Additionally, while the accessory A is generally illustrated and described herein as a wireless speaker, it is envisioned that the mounting system 100 may be configured to support a wide variety of accessories A (e.g., a television, a monitor or other such displays, etc.).

The mounting system 100 includes an outer (first) bracket 102 (FIGS. 1-3) that is configured for releasable and movable connection to the vehicle V, an inner (second) bracket 104 that is movable in relation to the outer bracket 102, and a series of articulable arms (plates) 106 (FIG. 3) that extend between the brackets 102, 104. Via articulation of the arms 106, as will be described in further detail below, the mounting system 100 is reconfigurable between a collapsed configuration (FIGS. 1, 2), in which the outer bracket 102 is at least partially received by the inner bracket 104 such that the brackets 102, 104 are oriented in a nested arrangement, and an expanded configuration (FIGS. 6-8), in which the brackets 102, 104 are separated from one another.

The outer bracket 102 includes a body 108 having a lower portion 110 and an upper portion 112, and may include (e.g., may be formed from) any suitable metallic or non-metallic material (or combination of materials). The body 108 further includes engagement members 114 (FIG. 3) that extend forwardly (towards the inner bracket 104) so as to define flanges 116 that are engageable with the arms 106, as will be discussed in further detail below.

Although shown as being generally rectangular in configuration throughout the figures, it should be appreciated that the outer bracket 102 may include alternate geometric configurations in other embodiments of the disclosure (e.g., depending upon the configuration of the vehicle V, the configuration of the accessory A, the intended location(s) of the mounting system 100, etc.).

Figure 2:
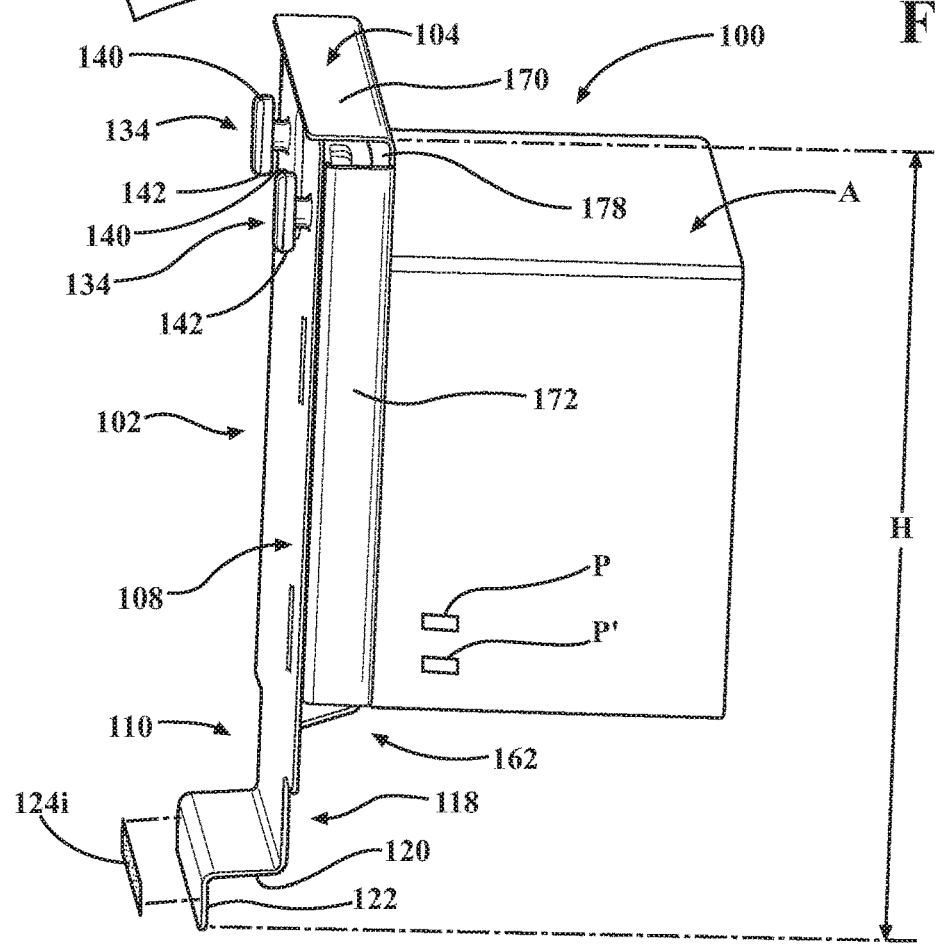
FIG. 2 is a side, perspective view of the mounting system and the accessory seen in FIG. 1 shown separated from the utility track in the vehicle.

As seen in FIG. 2, for example, the lower portion 110 of the body 108 may include a foot 118 (or other such support member) that is configured for contact with the vehicle V to assist in stabilizing the mounting system 100 and thereby mitigate, if not entirely prevent, undesirable movement of the mounting system 100 (e.g., shaking, rattling, vibration, etc.). More specifically, in such embodiments, the foot 118 may extend rearwardly (away from the accessory A) so as to define an extension 120 that extends transversely (e.g., orthogonally or at any other suitable angle) in relation to the body 108, and an engagement section 122 that extends transversely (e.g., orthogonally or at any other suitable angle) in relation to the extension 120 such that the engagement section 122 and the body 108 extend in generally parallel relation. It is also envisioned that the lower portion 110 of the body 108 (e.g., the foot 118) may include a dampener 124i (e.g., a pad or other such shock/force absorber) formed from any suitable material (e.g., foam, rubber, etc.) to further stabilize the mounting system 100 and/or further reduce undesirable movement.

To enhance the stability of the mounting system 100, the mounting system 100 may further include (or may be usable with) one or more (optional) securement mechanisms 126 (FIGS. 4-6). For example, the securement mechanism 126 may include one or more clamps 128 that are repositionable between an open configuration (FIG. 5), in which the clamp(s) 128 are disengaged from the mounting system 100 (and/or the vehicle V), and a closed configuration (FIGS. 4, 6), in which the clamp(s) 128 are in engagement with the mounting system 100 (and/or the vehicle V). It should be appreciated, however, that the particular configuration and/or implementation of the securement mechanism 126 may be varied in alternate embodiments of the disclosure. Additionally, although shown as being connected to the foot 118 of the outer bracket 102 in the illustrated embodiment such that the securement mechanism 126 is movable into and out of engagement with the vehicle V, alternatively, it is envisioned that the securement mechanism 126 may be connected to the vehicle V such that the securement mechanism 126 is instead movable into and out of engagement with the mounting system 100 (e.g., with the foot 118 or other suitable section of the body 108). Moreover, while the securement mechanism 126 is illustrated as being fixedly connected to the mounting system 100 (e.g., via a series of mechanical fasteners 130), alternatively, it is envisioned that the securement mechanism 126 may be releasably connected to the mounting system 100 (or to the vehicle V) in alternate embodiments of the disclosure, such as, for example, through the use of suction cups or other such suitable mechanisms or structures.

The upper portion 112 of the body 108 includes one or more fasteners 132 that are configured for engagement with the vehicle V to secure the outer bracket 102 (and, thus, the mounting system 100) to the vehicle V. Although illustrated as including a pair of fasteners 132 throughout the figures, it should be appreciated that the number of fasteners 132 may be varied in alternate embodiments of the present disclosure.

Figure 3:
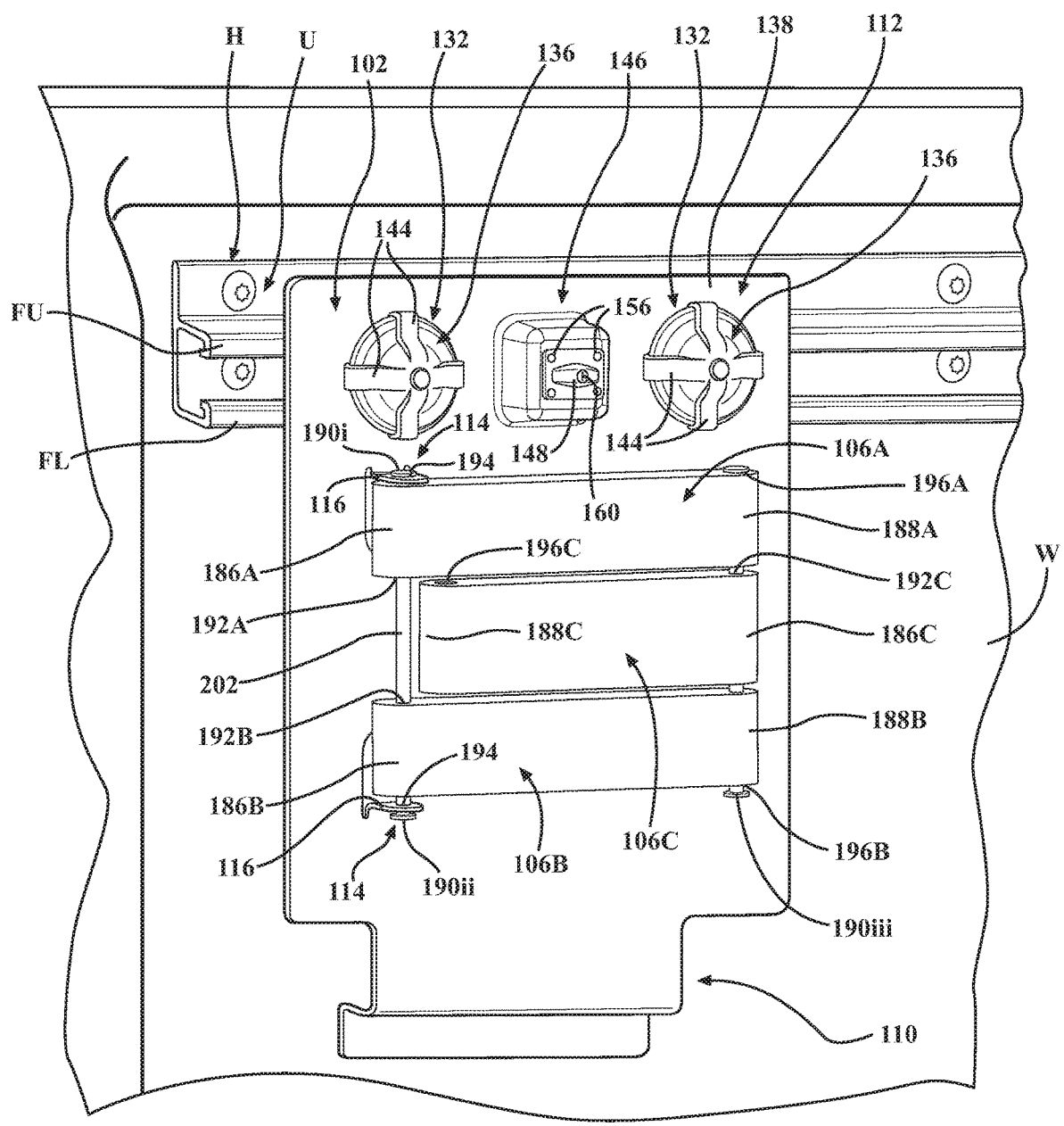
FIG. 3 is a front, perspective view of a first (outer) bracket of the mounting system, which includes a series of movable arms.

In the particular embodiment of the mounting system 100 seen in FIGS. 1-11, the fasteners 132 are configured for releasable engagement with the utility track U (FIGS. 1, 3). More specifically, the fasteners 132 each include a latch 134 (FIG. 2), and a tactile member 136 that allows for rotation of the latch 134 such that the fasteners 132 are repositionable between a disengaged (first) position and an engaged (second) position. As seen in FIG. 2, for example, the latches 134 are positioned rearwardly (behind) the body 108 of the outer bracket 102, and the tactile members 136 are positioned adjacent a forward (outer or front) surface 138 of the body 108. In the disengaged position, the latches 134 are oriented in generally parallel relation to the utility track U (i.e., approximately 90° from the orientation seen in FIG. 2) such that the latches 134 are positionable between upper and lower flanges FU, FL defined by the utility track U, and in the engaged position, the latches 134 are oriented in generally orthogonal relation to the utility track U (as seen in FIG. 2) such that ends 140, 142 of the latches 134 are engageable with inner (rear) surfaces of the flanges FU, FL, respectively, to secure the outer bracket 102 to the utility track U.

In the illustrated embodiment, the tactile members 136 are illustrated as including a series of raised ribs 144 to facilitate manual manipulation (i.e., rotation) by the user. It should be appreciated, however, that the particular configuration of the tactile members 136 may be varied in alternate embodiments of the disclosure.

Figure 7:
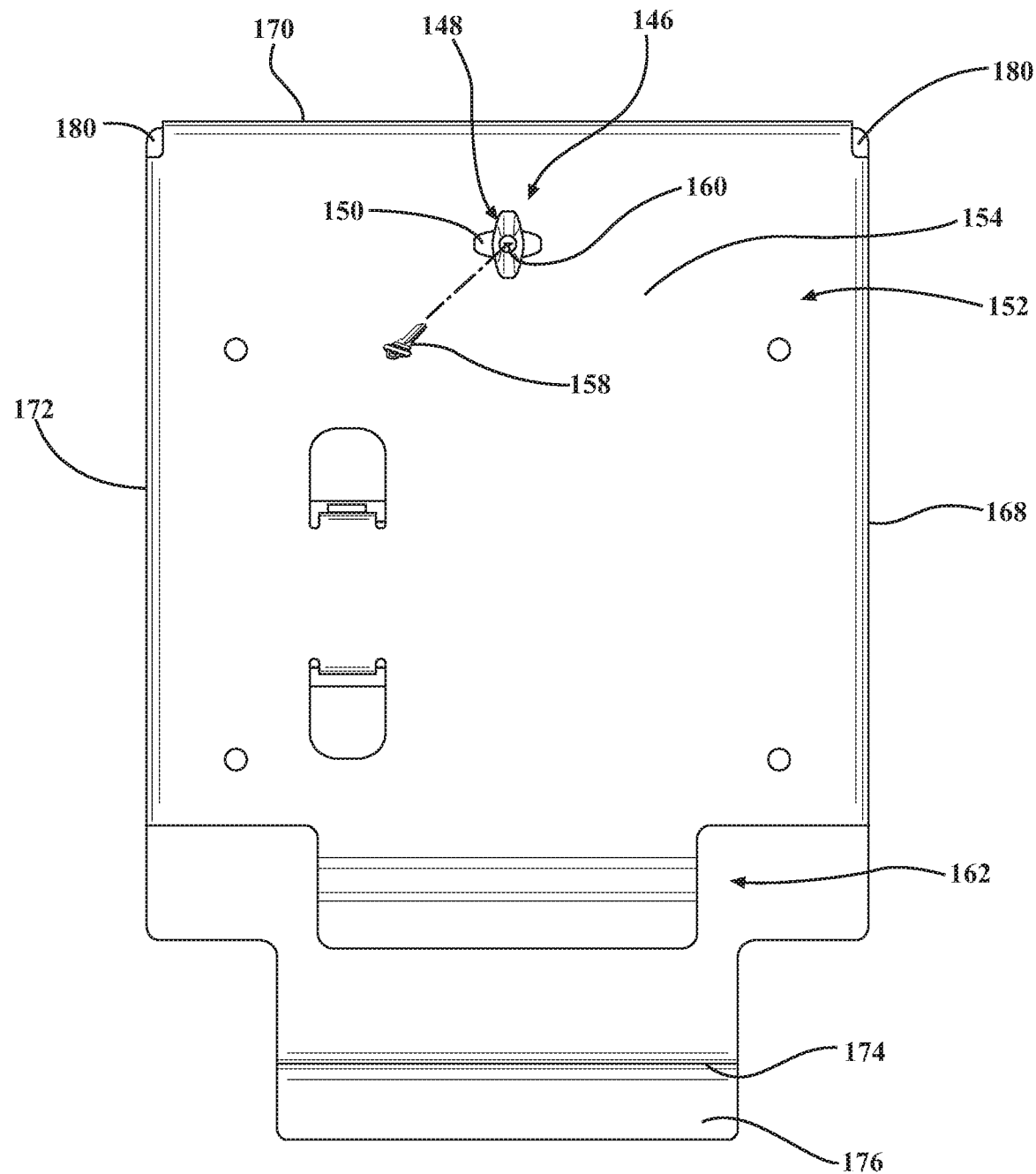
FIG. 7 is a front, plan view of the mounting system shown with the accessory removed.

In certain embodiments, such as that seen in FIGS. 1-11, the outer bracket 102 may further include a locking mechanism 146 that is configured and dimensioned for engagement with the inner bracket 104, as seen in FIG. 7, to maintain the collapsed configuration of the mounting system 100. More specifically, in the illustrated embodiment, the locking mechanism includes a locking member 148 (FIGS. 3, 7) that is rotatable between an unlocked (first) position (FIG. 1) and a locked (second) position (FIG. 7). In the unlocked position, the locking member 148 is oriented in general alignment with a corresponding opening 150 (FIGS. 7, 8) formed in (and extending through) a body 152 of the inner bracket 104 such that the locking member 148 is extendable through the opening 150 when the mounting system 100 is in the collapsed configuration. In the locked position, however, the locking member 148 is oriented out of general alignment with the opening 150 (e.g., the locking member 148 is oriented transversely in relation to the opening 150), such that the locking member 148 is engageable with an outer surface 154 of the inner bracket 104 to thereby restrict (if not entirely prevent) movement of the inner bracket 104 in relation to the outer bracket 102 to thereby maintain the collapsed configuration of the mounting system 100. Although shown as being secured to the outer bracket 102 via a series of mechanical fasteners 156 (e.g., screws, bolts, clips, etc.) (FIG. 3), in alternate embodiments, the locking mechanism 146 may be secured to the outer bracket 102 via welding, adhesives, or using any other such suitable methods and/or structures.

In certain embodiments, it is envisioned that the locking mechanism 146 may be configured for use with a key 158 (FIG. 7). More specifically, it is envisioned that the key 158 may be insertable into an opening 160 formed in the locking member 148 to allow for movement of the locking member 148 between the unlocked and locked positions (FIGS. 1, 7, respectively). By requiring use of the key 158 to reposition the locking member 148, the locking mechanism guards against the unwanted removal and/or theft of the mounting system 100 and/or the accessory A, as described in further detail below.

Figure 8:
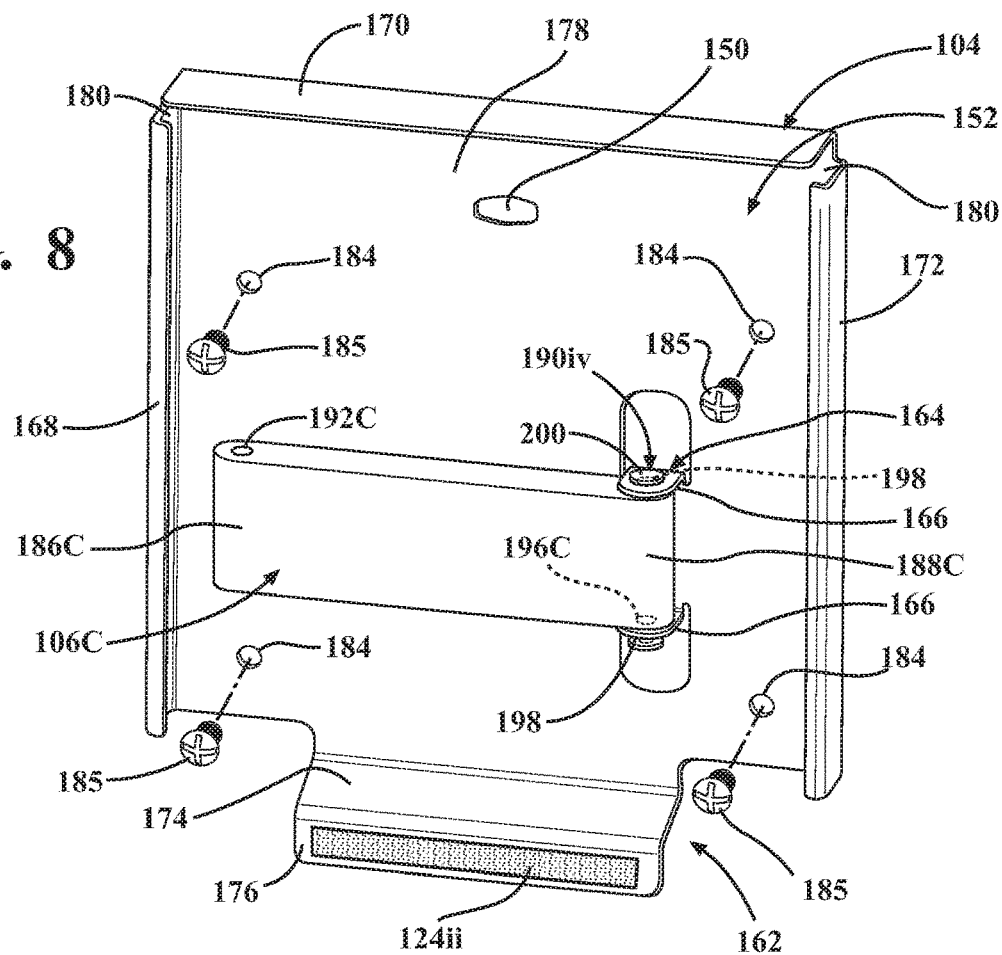
FIG. 8 is a rear, perspective view of an inner bracket of the mounting system shown separated from the outer bracket and connected to one of the movable arms.

With reference now to FIGS. 2, 7, and 8, the inner bracket 104 will be discussed. The inner bracket 104 includes the aforementioned opening 150 (FIG. 8), as well as a foot 162 (or other such support member) that is configured for contact with the outer bracket 102, one or more engagement members 164 (FIG. 8) that extend rearwardly from the body 152 of the inner bracket 104 (towards the outer bracket 102) so as to define flanges 166, and a series of walls 168, 170, 172. Although shown as being generally rectangular (or square-shaped) in configuration throughout the figures, it should be appreciated that the inner bracket 102 may include alternate geometric configurations in other embodiments of the disclosure (e.g., depending upon the configuration of the vehicle V, the configuration of the accessory A, the intended location(s) of the mounting system 100, etc.).

The foot 162 of the inner bracket 104 assists in stabilizing the brackets 102, 104 in relation to one another to thereby mitigate, if not entirely prevent, undesirable movement of the bracket 102 and/or the bracket 104 (e.g., shaking, rattling, etc.). More specifically, the foot 162 extends rearwardly (away from the accessory A and towards the outer bracket 102) so as to define an extension 174 that extends transversely (e.g., orthogonally or at any other suitable angle) in relation to the body 152 of the inner bracket 104, and an engagement section 176 that extends transversely (e.g., orthogonally or at any other suitable angle) in relation to the extension 174 such that the engagement section 176 and the body 152 extend in generally parallel relation. It is also envisioned that the inner bracket 104 (e.g., the foot 162) may include a dampener 124*ii* (e.g., a pad or other such shock/force absorber) formed from any suitable material (e.g., foam, rubber, etc.) to further stabilize the brackets 102, 104 in relation to one another and/or further reduce undesirable movement therebetween.

With reference to FIGS. 1-3, 7, and 8, the brackets 102, 104 generally correspond in configuration, and define mating profiles, to facilitate nesting of the brackets 102, 104 when the mounting system 100 is in the collapsed configuration. More specifically, the walls 168, 170, 172 extend rearwardly from the body 152 of the inner bracket 104 (towards the outer bracket 102) so as to collectively define an interior space 178 (FIGS. 2, 8) that is configured to accommodate the outer bracket 102, including the locking mechanism 146 and the fasteners 132, such that the outer bracket 102 is at least partially received by the inner bracket 104 when the mounting system 100 is in the collapsed configuration. Although the walls 168, 170, 172 are illustrated as being discrete structures that are arranged to define gaps 180 (FIGS. 7, 8) therebetween, in alternate embodiments of the disclosure, it is envisioned that the walls 168, 170, 172 may be integrally (e.g., monolithically) formed so as to eliminate the gaps 180. In certain embodiments, to further facilitate nesting of the brackets 102, 104 and/or stability of the mounting system 100, the outer bracket 102 may include a flange 182 (FIG. 1) that extends forwardly (towards the inner bracket 104) from the upper portion 112 such that the flange 182 is positionable beneath the wall 170 (FIGS. 7, 8) of the inner bracket 104.

In the illustrated embodiment, the inner bracket 104 further defines a series of openings 184 (FIG. 8) that are configured and dimensioned to receive corresponding mechanical fasteners 185 (e.g., screws, bolts, clips, etc.) to secure the accessory A (FIGS. 1, 2) to the inner bracket 104. Alternate methods of connecting the accessory A to the inner bracket 104, however, would not be beyond the scope of the present disclosure.

In various embodiments of the mounting system 100, it is envisioned that an overall height H (FIG. 2) of the mounting system 100 may be varied to accommodate use with different vehicles V, and/or positioning of the mounting system 100 in a variety of locations, either by lengthening or shortening the outer bracket 102 and/or the inner bracket 104. For example, the overall height H of the mounting system 100 may be reduced to allow the mounting system 100 to avoid certain structural features or components of the vehicle V (e.g., wheelhouses, etc.).

With reference now to FIGS. 3, 7, and 8, the arms 106 will be discussed. In the illustrated embodiment, the arms 106 include an upper (first) arm 106A, a lower (second) arm 106B, and an intermediate (third) arm 106C that is positioned between the arms 106A, 106B. The upper arm 106A includes opposite (first and second) end portions 186A, 188A, the lower arm 106B includes opposite (first and second) end portions 186B, 188B, and the intermediate arm 106C includes opposite (first and second) end portions 186C, 188C.

As seen in FIG. 3, for example, the first end portions 186A, 186B of the arms 106A, 106B are connected to the flanges 116 on the outer bracket 102 by (first and second) pivot members 190i, 190ii (e.g., pins, dowels, or other such suitable structures). More specifically, the pivot members 190i, 190ii extend through corresponding openings 192A, 192B respectively defined by the end portions 186A, 186B of the arms 106A, 106B, and through openings 194 defined by the flanges 116, such that the arms 106A, 106B are concomitantly pivotable in relation to the outer bracket 102.

The second end portions 188A, 188B of the arms 106A, 106B are connected to each other and to the first end portion 186C of the intermediate arm 106C by a (third) pivot member 190iii (e.g., a pin, dowel, or other such suitable structure). More specifically, the pivot member 190iii extends through corresponding openings 196A, 196B defined by the end portions 188A, 188B of the arms 106A, 106B, respectively, and through an opening 192C defined by the end portion 186C of the arm 106C, such that the arm 106C is pivotable in relation to the arms 106A, 106B. The end portion 188C of the arm 106C is connected to the flanges 166 on the inner bracket 104 by a (fourth) pivot member 190iv (e.g., a pin, dowel, or other such suitable structure) that extends through openings 198 defined by the flanges 166, and an opening 196C defined by the end portion 188C of the arm 106C, such that the inner bracket 104 (and, thus, the accessory A) is pivotable in relation to the third arm 106C.

To maintain engagement between the pivot members 190i-190iv, the flanges 116, 166, and the arms 106A, 106B, 106C, it is envisioned that the pivot members 190i-190iv may each include heads 200 (FIG. 8), caps, or other such structures defining transverse dimensions (e.g., diameters) greater than corresponding dimensions defined by the openings 194, 198 defined by the flanges 116, 166, respectively, and the respective openings 192A-192C, 196A-196C defined by the arms 106A, 106B, 106C.

As seen in FIG. 3, the mounting system 100 may include one or more spacers 202 (e.g., bushings, collars, washers, or other such members/structures) to support the arms 106A, 106B, 106C during articulation. For example, the mounting system 100 may include a spacer 202 positioned between the first end portions 186A, 186B of the arms 106A, 106B, as well as spacers 202 between the second end portions 188A, 188B of the arms 106A, 106B and the first end portion 186C of the arm 106C, which are not shown in FIG. 3.

Figure 9:
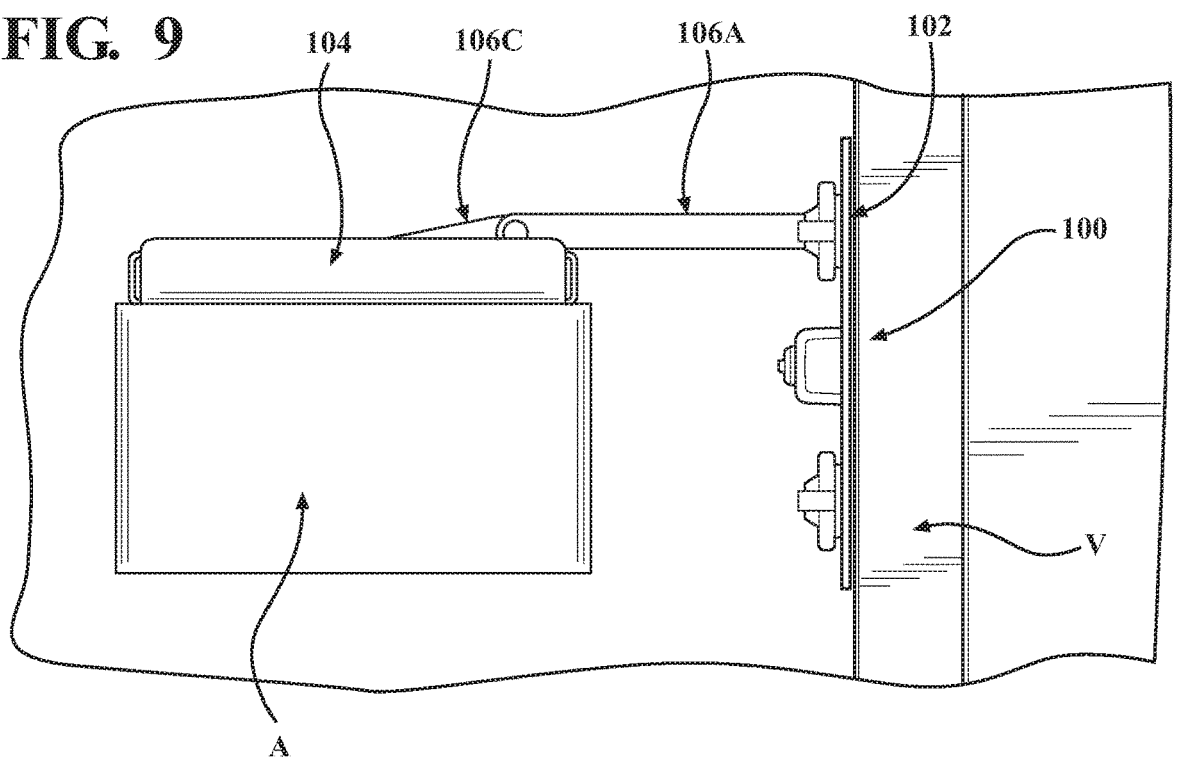
FIG. 9 is a top, plan view of the mounting system shown in an expanded configuration together with the accessory.
Figure 10:
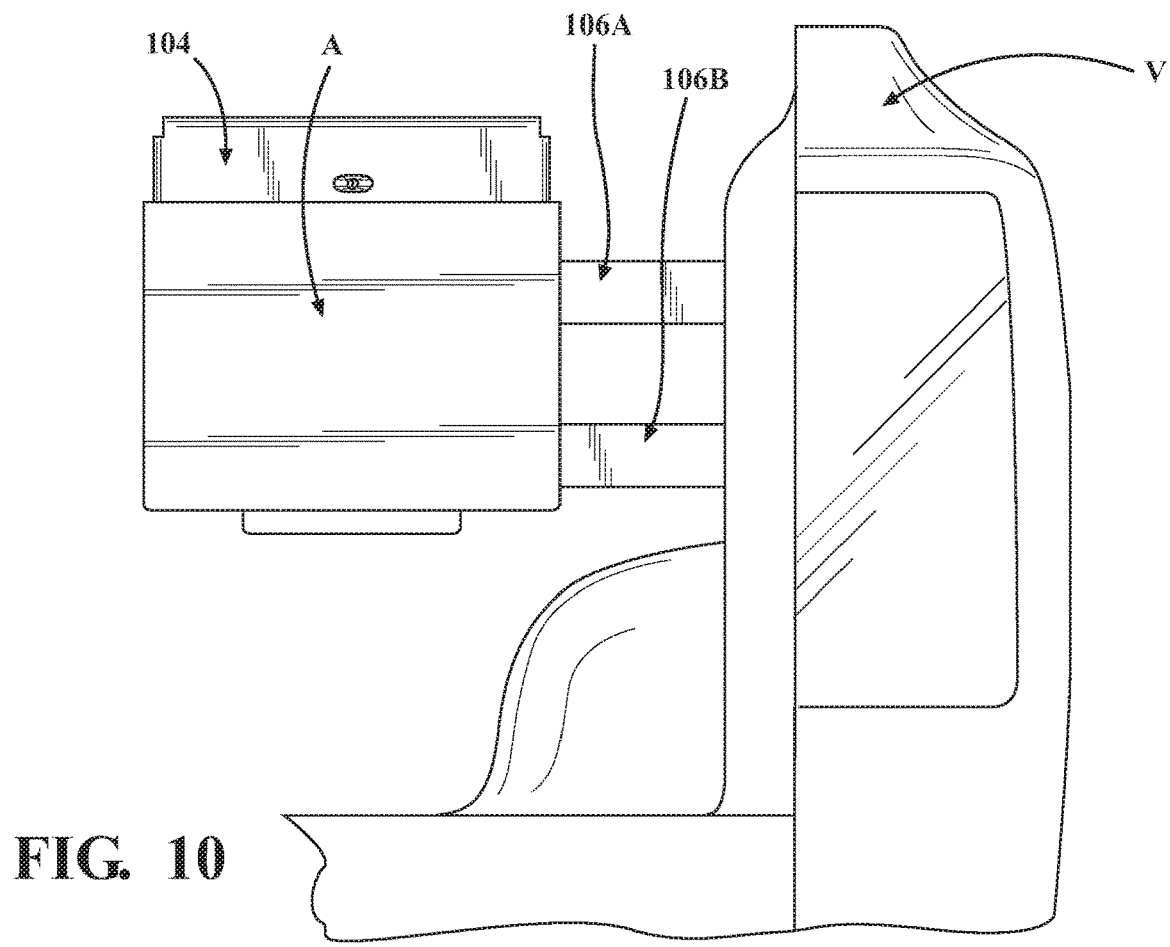
FIG. 10 is a rear, plan view of the mounting system shown in the expanded configuration together with the accessory.
Figure 11:
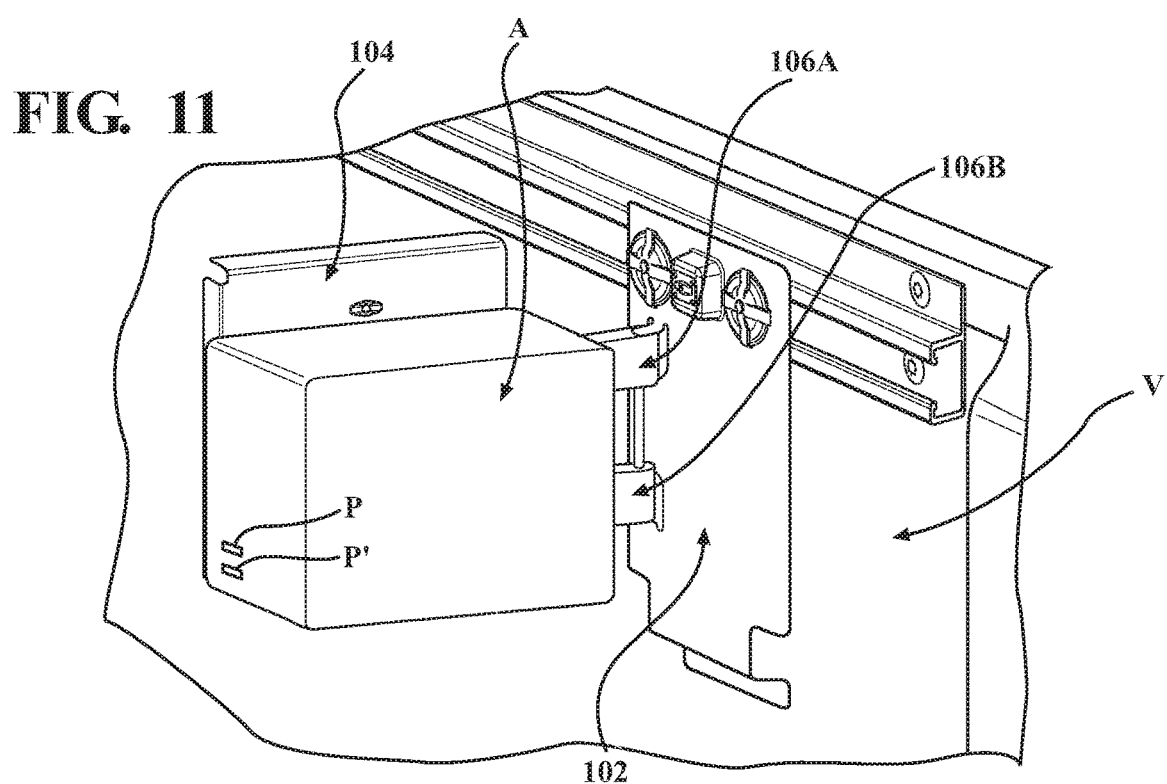
FIG. 11 is a side, perspective view of the mounting system shown in the expanded configuration together with the accessory.

When the mounting system 100 is in the collapsed configuration (FIGS. 1-3), the arms 106A, 106B, 106C each extend in generally parallel relation to the brackets 102, 104, as seen in FIG. 3, for example. In the expanded configuration, however, at least one of the arms 106A, 106B, 106C extends transversely in relation to the outer bracket 102, as seen in FIGS. 9-11. For example, it is envisioned that the arms 106A, 106B may remain in generally parallel relation to the outer bracket 102, and that the arm 106C may extend transversely in relation to the outer bracket 102 such that the inner bracket 104 (and the accessory A) is spaced a first distance from the outer bracket 102. Alternatively, when greater spacing is desired between the outer bracket 102 and the inner bracket 104 (and the accessory A), the arms 106A, 106B may be articulated as well, as seen in FIGS. 9-11, such that the inner bracket 104 (and the accessory A) is spaced a second, greater distance from the outer bracket 102.

In an alternate configuration, it is envisioned that the pivot members 190i, 190ii may be replaced by a single pivot member 190 that extends between (and through) the first end portions 186A, 186B of the arms 106A, 106B. In such embodiments, the aforementioned spacer 202 located between the arms 106A, 106B may be eliminated, and the number of pivot members 190 may be reduced from four to three.

In another configuration, it is also envisioned that the lower arm 106B (FIG. 3) may be eliminated. In such embodiments, the first end portion 186A of the arm 106A is connected to the flange(s) 116 on the outer bracket 102 by the pivot member 190i; the second end portion 188A of the arm 106A is connected to the first end portion 186C of the arm 106C by the pivot member 190iii, the length of which can be reduced when compared to the embodiments discussed above; and the second end portion 188C of the arm 106C is connected to the flanges 166 (defined by the inner bracket 104) by the pivot member 190iv.

With reference again to FIGS. 1-11, use of the mounting system 100 will be discussed. Initially, to connect the mounting system 100 to the hardware H (FIG. 1) in the vehicle V (e.g., to the utility track U), the locking mechanism 146 is moved into the unlocked configuration (FIGS. 3, 7) (e.g., via the key 158) such that the inner bracket 104 can be separated from the outer bracket 102. As the inner bracket 104 is separated from the outer bracket 102, the locking member 148 passes through the opening 150 (FIG. 8) defined by the inner bracket 104 to allow the arms 106A, 106B, 106C (FIG. 3) to articulate. Upon separation of the brackets 102, 104, the fasteners 132 are exposed and can be positioned in the disengaged position (i.e., via rotation of the tactile members 136) such that the latches 134 are oriented in generally parallel relation to the utility track U. The latches 134 are then inserted into the utility track U, and the fasteners 132 are rotated into the engaged position (FIG. 2) such that the ends 140, 142 of the latches 134 engage the upper and lower flanges FU, FL (FIG. 1) defined by the utility track U, respectively, to secure the outer bracket 102 to the utility track U. To further secure the mounting system 100 to the vehicle V, and/or enhance the stability of the mounting system 100, the (optional) securement mechanism 126 (FIGS. 4-6) may be engaged by moving the clamp(s) 128 from the open configuration (FIG. 5) to the closed configuration (FIG. 6).

The accessory A can then be positioned as desired via movement of the inner bracket 104 relative to the outer bracket 102 and/or manipulation (i.e., pivoting) of the inner bracket 104 (and, thus, the accessory A) in relation to the third arm 106C (FIGS. 9-11). In certain embodiments, it is envisioned that the accessory A may include a series of ports P, P' to support charging of the accessory A, the charging or connection of a personal electronic device (e.g., a cell phone), or auxiliary input. Although illustrated as including two ports P, P' in the embodiment seen in FIG. 2 (for example), it should be appreciated that the number and/or configuration of the ports P, P' may be varied in alternate embodiments of the disclosure (e.g., the ports P, P' may be configured for USB connection, to support an AC power plug/adapter, etc.). It is also envisioned that the accessory A may be configured for connection to a power source in the vehicle V (e.g., via the AC power plug/adapter).

Following use, the mounting system 100 can be returned to the collapsed configuration (FIGS. 1-3), during which, the arms 106A, 106B, 106C are articulated and returned to the positions seen in FIG. 3, and the locking member 148 is passed through the opening 150 defined by the inner bracket 104. The locking mechanism 146 can then be moved into the locked configuration (e.g., via insertion of the key 158 (FIG. 7) and rotation of the locking member 148) to secure the inner bracket 104 in relation to the outer bracket 102.

To remove the mounting system 100 from the vehicle V, the locking mechanism 146 is moved into the unlocked configuration (FIGS. 3, 7), and the inner bracket 104 is separated from the outer bracket 102 to thereby expose the fasteners 132. The fasteners 132 can then be moved into the disengaged position (i.e., via rotation of the tactile members 136) such that the latches 134 are oriented in generally parallel relation to the utility track U, and the latches 134 can be removed from the utility track U (FIG. 1), thus separating the mounting system 100 from the vehicle V.

With reference to FIGS. 1, 2, and 8, to remove the accessory A from the mounting system 100, the locking mechanism 146 is moved into the unlocked configuration (FIG. 1), and the inner bracket 104 is separated from the outer bracket 102 to thereby expose the mechanical fasteners 185 (FIG. 8) connecting the accessory A to the inner bracket 104. The mechanical fasteners 185 can thereafter be removed to separate the accessory A from the inner bracket 104.

As can be appreciated through reference to FIG. 2, for example, when the mounting system 100 is in the collapsed configuration, the fasteners 132 and the mechanical fasteners 185 (FIG. 8) are positioned between the brackets 102, 104, within the interior space 178, and are thus hidden from view. The locking mechanism 146 thus inhibits, if not entirely prevents, theft of the mounting system 100 and/or the accessory A.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments. For example, although generally discussed in the context of the front-end of the vehicle V (FIG. 1) herein, as mentioned above, it should be appreciated that any of the various embodiments of the presently disclosed energy absorber may be utilized in the rear-end of the vehicle V as well.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle, comprising:
   a utility track secured to a wall of the vehicle; and
   a mounting system configured to support an accessory, the mounting system being configured for releasable connection to the utility track and being reconfigurable between a collapsed configuration and an expanded configuration, the mounting system including:
   a first bracket configured for releasable connection to the utility track;
   a second bracket movably connected to the first bracket and configured to support the accessory, wherein the first bracket includes at least one fastener configured to releasably engage the utility track in the vehicle, and the at least one fastener is positioned between the first and second brackets such that the at least one fastener is inaccessible when the mounting system is in the collapsed configuration; and
   a locking member configured for removable insertion into an opening defined in the second bracket, the locking member being rotatable between a first position, in which the locking member is positioned to engage the second bracket to maintain the collapsed configuration of the mounting system, and a second position, in which the locking member is positioned for passage through the opening in the second bracket to permit movement of the second bracket in relation to the first bracket such that the mounting system is movable into the expanded configuration.

2. The vehicle of claim 1, wherein the first bracket includes a series of articulable arms, the arms extending in generally parallel relation to the first bracket when the mounting system is in the collapsed configuration, and at least one of the arms extending transversely in relation to the first bracket when the mounting system is in the expanded configuration.

3. The vehicle of claim 2, wherein the series of arms includes a first arm and a second arm, the first arm having a first end portion pivotably connected to a body of the first bracket and an opposite second end portion, the second arm having a first end portion pivotally connected to the second end portion of the first arm and an opposite second end portion pivotally connected to the second bracket such that the second bracket is pivotable in relation to the second arm.

4. The vehicle of claim 2, wherein the series of arms includes a first arm, a second arm, and a third arm, the second arm being positioned between the first arm and the third arm, wherein the first arm and the third arm are each pivotally connected to a body of the second bracket, and the second arm is pivotally connected to the first arm and the third arm.

5. The vehicle of claim 4, wherein the second arm includes opposite first and second end portions, the first end portion of the second arm being pivotally connected to the first arm and the third arm, and the second end portion of the second arm being pivotally connected to the first bracket such that the second bracket is pivotable in relation to the second arm.

6. The vehicle of claim 1, wherein the at least one fastener is rotatable between first and second positions, the at least one fastener being oriented in general alignment with the utility track in the first position such that the at least one fastener is disengageable from the utility track to allow for movement of the first bracket in relation to the utility track, and the at least one fastener being oriented out of general alignment with the utility track in the second position such that the at least one fastener is engageable with the utility track to fixedly secure the first bracket to the utility track.

7. The vehicle of claim 1, wherein the locking member is configured to receive a key, the locking member being rotatable from the first position to the second position upon insertion of the key.

8. An accessory mounting system for a vehicle, comprising:
   a first bracket configured for releasable connection to a utility track in the vehicle;
   a second bracket movably connected to the first bracket and configured to support an accessory, wherein the first bracket includes a series of arms that are articulable to move the accessory mounting system between a collapsed configuration, in which each of the arms extends in generally parallel relation to the first bracket, and an expanded configuration, in which at least one of the arms extends transversely in relation to the first bracket; and
   a locking mechanism repositionable between a locked configuration, in which the locking mechanism is configured to maintain the collapsed configuration of the accessory mounting system such that the accessory mounting system is secured to the vehicle, and an unlocked configuration, in which the locking mechanism is configured to permit movement of the accessory mounting system into the expanded configuration such that the accessory mounting system is removable from the vehicle.

9. The accessory mounting system of claim 8, wherein the series of arms includes a first arm and a second arm, the first arm having a first end portion pivotably connected to a body of the first bracket and an opposite second end portion, the second arm having a first end portion pivotally connected to the second end portion of the first arm and an opposite second end portion pivotally connected to the second bracket such that the second bracket is pivotable in relation to the second arm.

10. The accessory mounting system of claim 8, wherein the series of arms includes a first arm, a second arm, and a third arm, the second arm being positioned between the first arm and the third arm, wherein the first arm and the third arm are each pivotally connected to a body of the first bracket, and the second arm is pivotally connected to the first arm and the third arm.

11. The accessory mounting system of claim 10, wherein the second arm includes opposite first and second end portions, the first end portion of the second arm being pivotally connected to the first arm and the third arm, and the second end portion of the second arm being configured to support the second bracket such that the second bracket is pivotable in relation to the second arm.

12. The accessory mounting system of claim 8, wherein the first bracket further includes at least one fastener configured to releasably engage the utility track in the vehicle, the at least one fastener being positioned between the first and second brackets such that the at least one fastener is inaccessible when the accessory mounting system is in the collapsed configuration.

13. The accessory mounting system of claim 12, wherein the at least one fastener is repositionable between a first position, in which the at least one fastener is positioned for disengagement from the utility track so as to allow for movement of the first bracket in relation to the utility track, and a second position, in which the at least one fastener is positioned for engagement with the utility track to fixedly secure the first bracket to the utility track.

14. The accessory mounting system of claim 13, wherein the at least one fastener is configured for rotation between the first position and the second position, the at least one fastener being oriented in general alignment with the utility track in the first position, and the at least one fastener being oriented out of general alignment with the utility track in the second position.

15. The accessory mounting system of claim 8, wherein the locking mechanism includes a locking member that is rotatable between a first position, in which the locking mechanism is in the locked configuration, and a second position, in which the locking mechanism is in the unlocked configuration.

16. The accessory mounting system of claim 15, wherein the locking member is configured to receive a key, the locking member being rotatable from the first position to the second position upon insertion of the key.

17. The accessory mounting system of claim 15, wherein the second bracket includes an opening configured to receive the locking member when the accessory mounting system is in the collapsed configuration, the locking member being configured to extend through the opening such that the locking member is engageable with the second bracket upon movement of the locking member into the first position to move the locking mechanism into the locked configuration.

18. An accessory mounting system for a vehicle, comprising:
   an outer bracket;
   an inner bracket movably connected to the outer bracket such that the accessory mounting system is reconfigurable between a collapsed configuration and an expanded configuration;
   a pivot member configured to pivotally connect the inner bracket to an accessory to facilitate repositioning of the accessory;
   at least one fastener configured to releasably connect the outer bracket to the vehicle, the at least one fastener being positioned between the inner and outer brackets such that the at least one fastener is inaccessible when the accessory mounting system is in the collapsed configuration; and a locking mechanism secured to the outer bracket, the locking mechanism being engageable with the inner bracket to maintain the collapsed configuration of the accessory mounting system and disengageable from the inner bracket to permit movement of the accessory mounting system into the expanded configuration.

19. The accessory mounting system of claim 18, wherein the locking mechanism includes a locking member configured for receipt by an opening formed in the inner bracket, the locking member being rotatable between a first position, in which the locking member is oriented in general alignment with the opening in the inner bracket to allow for insertion of the locking member into the opening and removal of the locking member from the opening, and a second position, in which the locking member is oriented out of general alignment with the opening in the inner bracket to prevent removal of the locking member from the opening.

20. The accessory mounting system of claim 19, wherein the locking member is configured to receive a key, the locking member being rotatable from the first position to the second position upon insertion of the key.

\* \* \* \* \*